United States Patent
Kaneko et al.

(10) Patent No.: US 12,030,551 B2
(45) Date of Patent: Jul. 9, 2024

(54) IMAGE PROCESSING DEVICE AND IMAGE PROCESSING METHOD

(71) Applicant: Clarion Co., Ltd., Saitama (JP)

(72) Inventors: Takayuki Kaneko, Saitama (JP); Mamoru Kubota, Sagamihara (JP); Shunsuke Kondo, Saitama (JP)

(73) Assignee: CLARION CO., LTD., Saitama (JP)

( * ) Notice: Subject to any disclaimer, the term of this patent is extended or adjusted under 35 U.S.C. 154(b) by 301 days.

(21) Appl. No.: 16/845,318

(22) Filed: Apr. 10, 2020

(65) Prior Publication Data

US 2020/0344448 A1 Oct. 29, 2020

(30) Foreign Application Priority Data

Apr. 25, 2019 (JP) ................................ 2019-083678

(51) Int. Cl.
*B62D 15/02* (2006.01)
*B60R 11/04* (2006.01)
(Continued)

(52) U.S. Cl.
CPC .......... *B62D 15/0285* (2013.01); *B60R 11/04* (2013.01); *G06T 7/73* (2017.01);
(Continued)

(58) Field of Classification Search
CPC .. G06T 7/73; H04N 7/16; B60R 11/04; G05D 1/0246
See application file for complete search history.

(56) References Cited

U.S. PATENT DOCUMENTS

2009/0207045 A1 8/2009 Jung
2011/0216194 A1* 9/2011 Kosaki ..................... H04N 7/18
348/148
(Continued)

FOREIGN PATENT DOCUMENTS

CN 103358993 10/2013
CN 104217611 12/2014
(Continued)

OTHER PUBLICATIONS

Extended European Search Report issued Jul. 31, 2020 in corresponding European Patent Application No. 20167657.4.
(Continued)

*Primary Examiner* — Anner N Holder
(74) *Attorney, Agent, or Firm* — Wenderoth, Lind & Ponack, L.L.P.

(57) ABSTRACT

An image processing device includes a camera configured to be mounted on a vehicle to capture an image around the vehicle, a marker detector to carry out an edge detection process on the image to detect corner markers on one end of a parking frame, a provisional parking frame setting part to set a provisional parking frame based on the detected corner markers on the one end, and a parking frame identifying part to identify the parking frame. The marker detector is configured to detect corner markers on another end of the parking frame in directions along sidelines of the provisional parking frame, and the parking frame identifying part is configured to identify the parking frame based on the corner markers on the one end and the corner markers on the other end.

14 Claims, 10 Drawing Sheets

(51) Int. Cl.
*G05D 1/00* (2024.01)
*G06T 7/73* (2017.01)
*G06V 10/147* (2022.01)
*G06V 20/56* (2022.01)
*G06V 20/58* (2022.01)
*H04N 7/16* (2011.01)

(52) U.S. Cl.
CPC .......... *G06V 10/147* (2022.01); *G06V 20/586* (2022.01); *G06V 20/588* (2022.01); *H04N 7/16* (2013.01); *G05D 1/0246* (2013.01)

(56) References Cited

U.S. PATENT DOCUMENTS

| | | | | |
|---|---|---|---|---|
| 2013/0265429 | A1* | 10/2013 | Yoon | G08G 1/14 348/148 |
| 2014/0355822 | A1 | 12/2014 | Choi et al. | |
| 2015/0310285 | A1* | 10/2015 | Ogata | B60R 1/00 382/104 |
| 2016/0110619 | A1* | 4/2016 | Kim | B60W 30/06 382/104 |
| 2019/0176888 | A1* | 6/2019 | Lee | G05D 1/0088 |
| 2019/0291722 | A1 | 9/2019 | Maeda et al. | |
| 2020/0074192 | A1* | 3/2020 | Ogata | B60W 30/06 |
| 2020/0151895 | A1* | 5/2020 | Kaneko | G06T 7/60 |

FOREIGN PATENT DOCUMENTS

| | | |
|---|---|---|
| CN | 104871204 | 8/2015 |
| CN | 109219546 | 1/2019 |
| CN | 109598972 | 4/2019 |
| JP | 2011-173585 | 9/2011 |
| JP | 2014-106740 | 6/2014 |
| JP | 2015-30363 | 2/2015 |
| JP | 2017-24598 | 2/2017 |
| JP | 2017024598 | * 2/2017 |
| TW | I656519 | 4/2019 |

OTHER PUBLICATIONS

Office Action issued Jan. 24, 2023 in Japanese Patent Application No. 2019-083678, with English translation.
Office Action issued Sep. 7, 2023 in Chinese Patent Application No. 202010236643.1, with English translation.
Berget et al., "Extending the parking space", Journal of Combinatorial Theory, Series A, vol. 123, pp. 43-56 (Apr. 2014).

* cited by examiner

IMAGE PROCESSING DEVICE AND IMAGE PROCESSING METHOD

CROSS-REFERENCE TO RELATED APPLICATION

The present application is based on and claims a priority benefit of Japanese patent application No. 2019-083678, filed on Apr. 25, 2019, the disclosure of which is hereby incorporated herein by reference in its entirety.

BACKGROUND

This disclosure relates to an image processing device and an image processing method.

A parking guide apparatus which automatically detects a partitioned parking section based on an image captured by cameras is taught by, for example, JP 2017-024598 A.

SUMMARY

There are several kinds of markers for partitioning parking sections. For example, an outline of a parking section is drawn by two white sidelines and two white end lines (i.e., front-end line and rear-end line). Alternatively, a parking section is indicated by corner markers having a T-shape or an L-shape.

A T-shaped corner marker (hereinafter referred to as "T-marker") has a lateral white line extending laterally and a vertical white line extending vertically from the center of the lateral white line. An L-shaped corner marker (hereinafter referred to as "L-marker") has a lateral white line extending laterally and a vertical white line extending vertically from one end of the lateral white line.

These corner markers are separately positioned at corners of parking sections, and no white line is drawn between the markers.

When a parking section is imaged by cameras mounted on a vehicle, a corner marker close to the vehicle (hereinafter referred to as "corner marker at front corner") is clearly imaged compared to a corner maker far from the vehicle ((hereinafter referred to as "corner marker at rear corner"). Therefore, the parking section is identified based on the corner marker at front corner in the image.

In such a case, a target parking frame determined based on the identified parking section is specifically determined with reference to the corner marker at front corner. Therefore, the vehicle is parked at the target parking frame by aligning the front end or the rear end of the vehicle with the front-end line of the parking frame, which forms an outline of the parking section.

However, it is not unusual to park a vehicle at a parking frame with reference to a corner marker at rear corner of a parking section and to align the rear end or the front end of the vehicle with the rear-end line of the parking frame.

An object of the present disclosure is, therefore, to provide an image processing device and an image processing method capable of properly identifying a parking frame based on a rear-end line of a parking section indicated by corner markers.

To achieve the above object, a first aspect of this disclosure describes an embodiment of an image processing device which comprises: a camera that is mounted on a vehicle, the camera being configured to capture an image around the vehicle; a marker detector that is configured to carry out an edge detection process on the image to detect corner markers on one end of a parking frame; a provisional parking frame setting part that is configured to set a provisional parking frame based on the corner markers on the one end detected by the marker detector; and a parking frame identifying part that is configured to identify the parking frame. The marker detector is configured to detect corner markers on the other end of the parking frame in directions along sidelines of the provisional parking frame. The parking frame identifying part is configured to identify the parking frame based on the corner markers on the one end and the corner markers on the other end.

A second aspect of this disclosure describes an embodiment of an image processing method using an image around a vehicle captured by a vehicle-mounted camera. The method comprises: detecting corner markers on one end of a parking frame by carrying out an edge detection process on the image; setting a provisional parking frame based on the detected corner markers on the one end; detecting corner markers on the other end of the parking frame in directions along sidelines of the provisional parking frame; and identifying a parking frame based on the detected corner markers on the one end and the detected corner markers on the other end.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Hereinafter, an embodiment of an image processing device and an image processing method of the present disclosure will be described with reference to the drawings.

Figure 1:
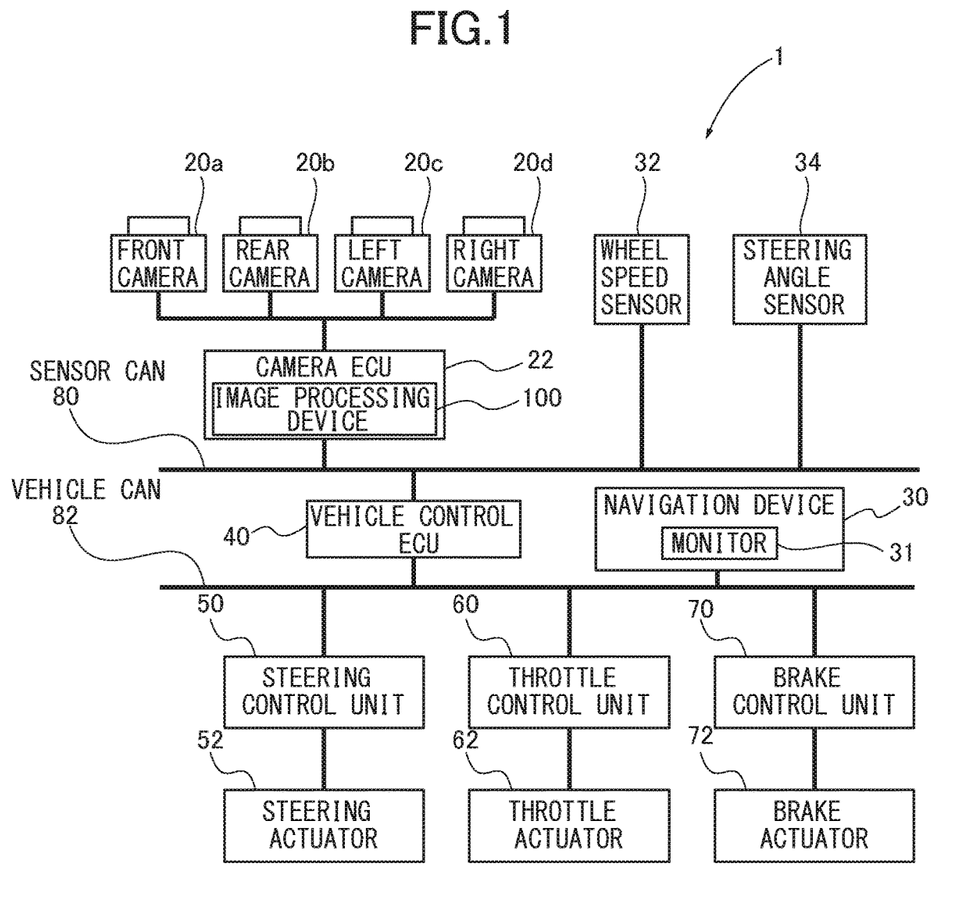
FIG. 1 is a block diagram showing a schematic configuration of a parking assist apparatus to which an embodiment of an image processing device of the present disclosure is applied.
Figure 2:
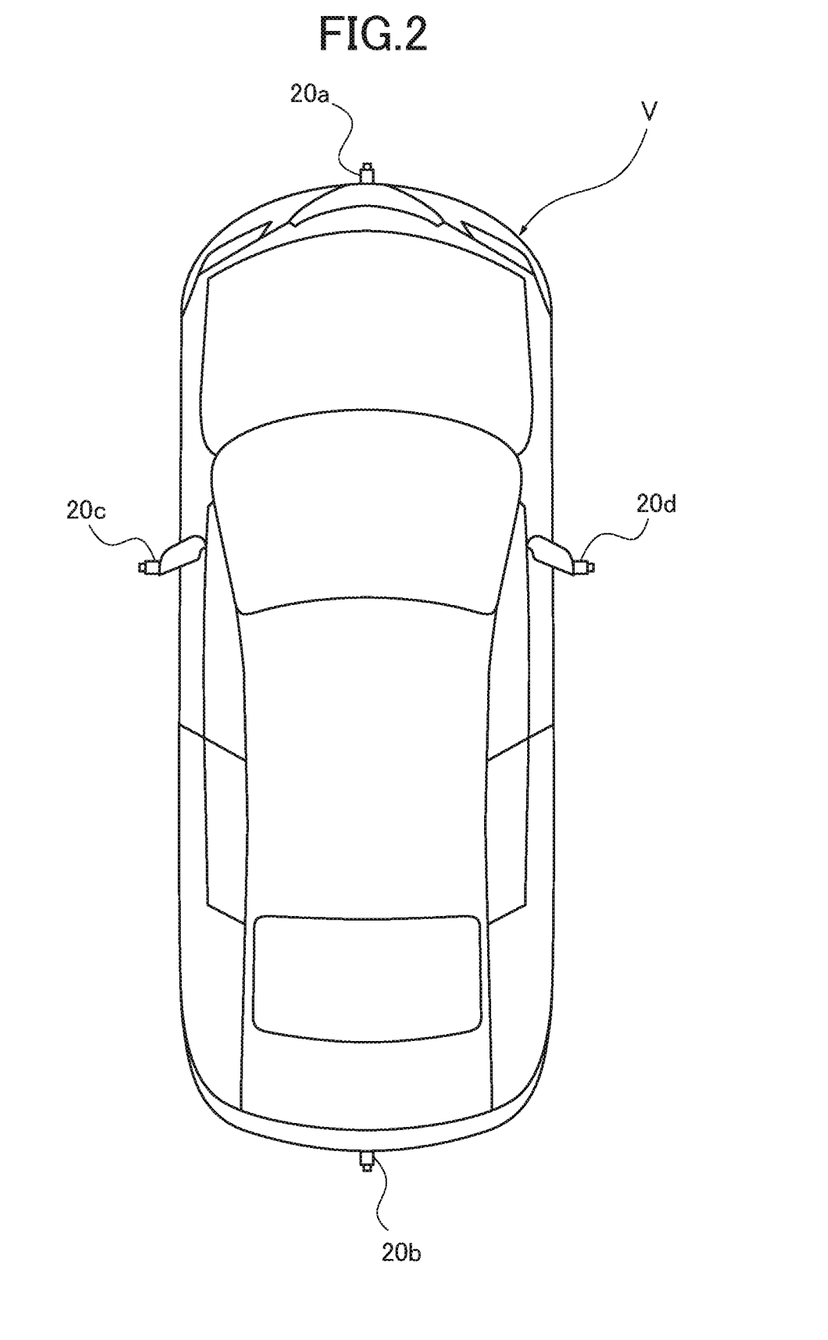
FIG. 2 is a schematic view showing an example of an arrangement of cameras (i.e., front camera, rear camera, left camera, and right camera) provided to the parking assist apparatus.
Figure 3:
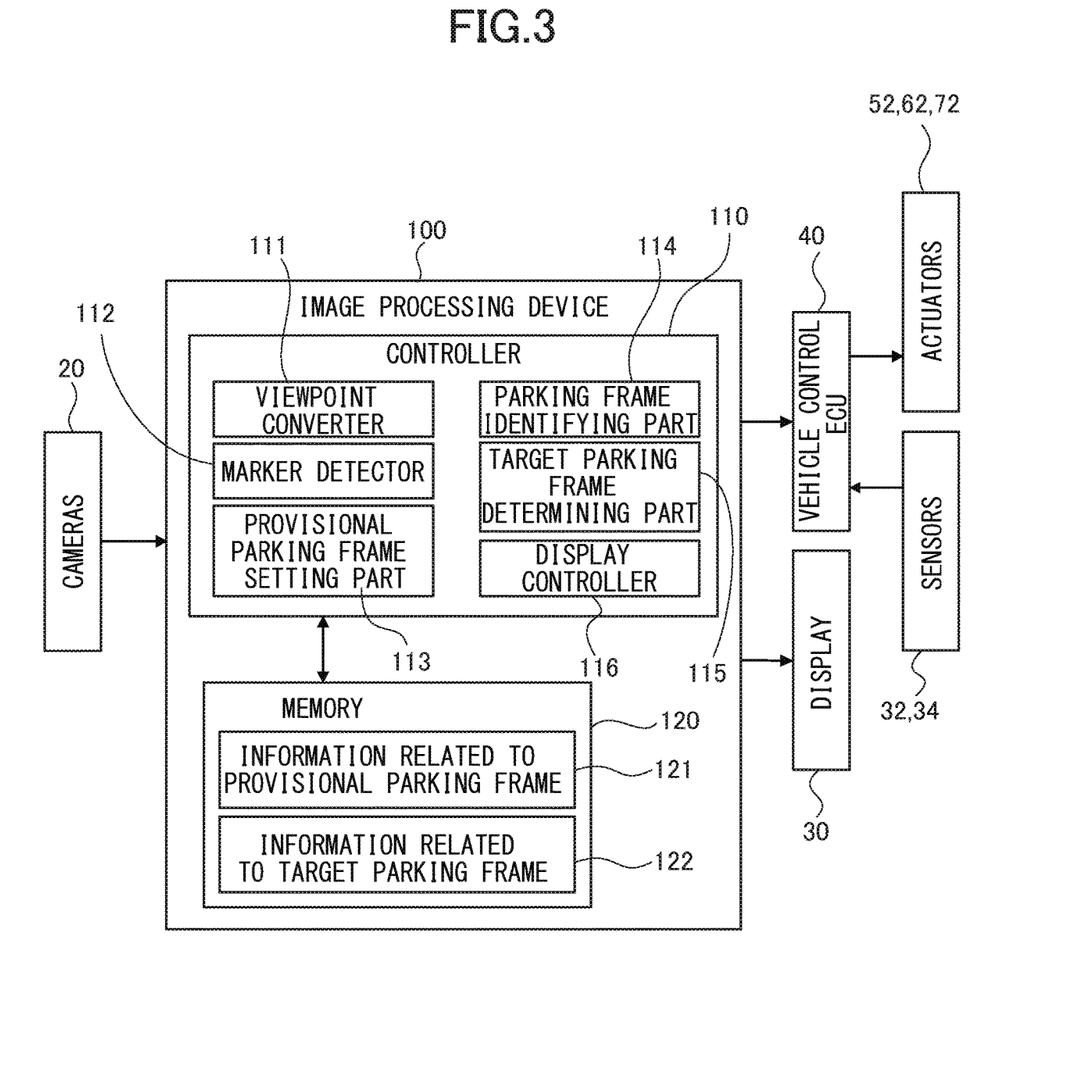
FIG. 3 is a functional block diagram showing a schematic configuration of the image processing device according to the embodiment.
Figure 4:
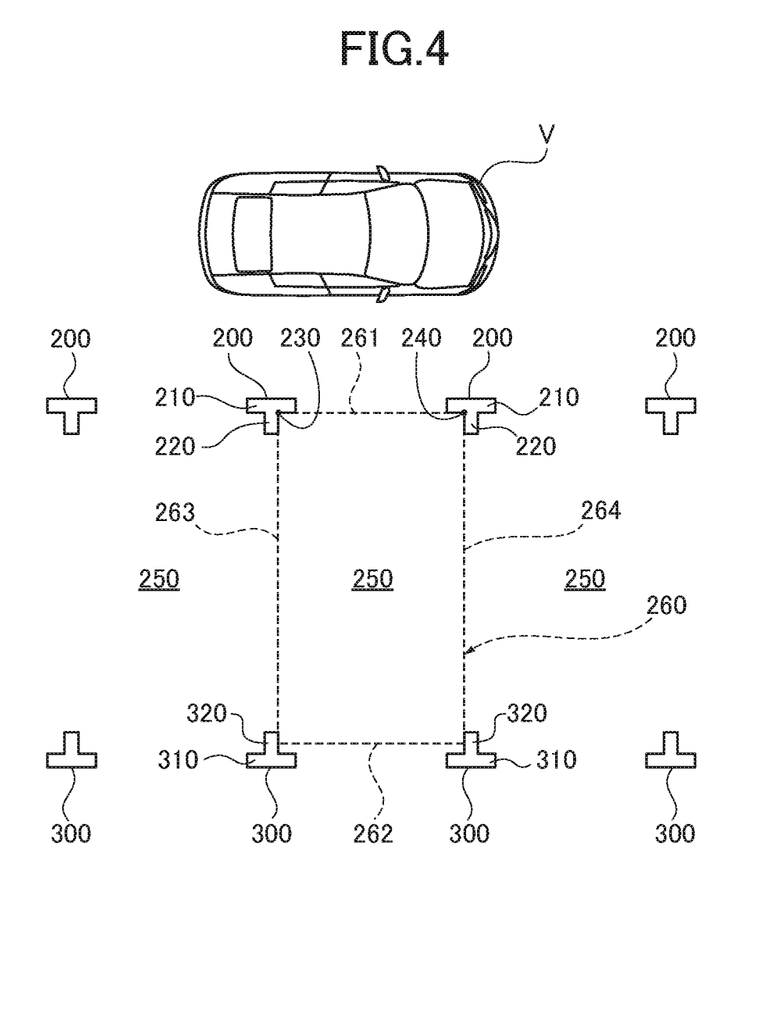
FIG. 4 is a schematic view showing a parking section indicated by four T-markers, as well as a provisional parking frame.

FIG. 1 is a block diagram showing a schematic configuration of a parking assist apparatus 1 to which an embodiment of an image processing device 100 of the present disclosure is applied. FIG. 2 is a schematic view showing an example of an arrangement of cameras 20 (i.e., front camera 20a, rear camera 20b, left camera 20c, and right camera 20d) provided to the parking assist apparatus 1. FIG. 3 is a functional block diagram showing a schematic configuration of the image processing device 100 according to the embodiment. FIG. 4 is a schematic view showing a parking section 250 indicated by four T-markers 200, 200, 300, 300, as well as a provisional parking frame 260.

The parking assist apparatus 1 of FIG. 1 is installed in a vehicle V (shown in FIG. 2) to carry out a parking assist operation. Specifically, the parking assist apparatus 1 is configured to detect a parking section 250 (shown in FIG. 4) based on images captured by the cameras (imaging devices) 20 of FIG. 2. The parking assist apparatus 1 then outputs signals to allow a vehicle control ECU 40 to guide the vehicle V to the parking section 250.

The parking section 250 means a rectangular parking area surrounded by the four T-markers 200, 200, 300, 300 positioned at the four corners thereof, respectively. The parking section 250 has a size larger than the vehicle V in the plane view.

The T-markers 200, 300 each has a lateral white line 210, 310 extending laterally and a vertical white line 220, 320 extending vertically from the center of the lateral white line 210, 310. As illustrated in FIG. 4, two of the T-markers 200, 200 positioned at the corners on one end (e.g., front end) of the parking section 250 and other two of the T-markers 300, 300 positioned at the corners on the other end (e.g., rear end) thereof are arranged to face each other. Here, the front end means an end close to the vehicle V when the vehicle V enters the parking section 250 to park. The rear end means an end far from the vehicle V when the vehicle V enters the parking section 250 to park. That is, the T-markers 200, 200 at the front end and the T-markers 300, 300 at the rear end are arranged symmetrically about top and bottom of FIG. 4.

The vertical white lines 220 of the T-markers 200 at front corners and the vertical white lines 320 of the T-markers 300 at rear corners are arranged in straight lines, respectively. Here, the lateral white lines 210 of the T-markers 200 at front corners and the lateral lines 310 of the T-markers 300 at rear corners are positioned on the outer side than the vertical white lines 220, 320.

For the parking section 250 partitioned by the four T-markers 200, 200, 300, 300, each of the T-markers 200, 200, 300, 300 is separately disposed from each other in the lateral direction and in the vertical direction, and no while line is drawn between the T-markers 200, 200, 300, 300.

As illustrated in FIG. 4, the vertical white lines 220, 320 partition the neighboring parking sections 250. Further, the lateral white line 210 partitions or defines the front end of the parking section 250 and the lateral white line 310 partitions or defines the rear end of the parking section 250.

When the image processing device 100 captures an image of the parking section 250 with the cameras 20 mounted on the vehicle V, the T-markers 200, 200 at front corners are clearly imaged compared to the T-markers 300, 300 at rear corners. Therefore, the image processing device 100 first detects the parking section 250 based on the T-markers 200 at front corners prior to initiating a parking operation.

The image processing device 100 then outputs signals to the vehicle control ECU 40 based on the detected parking section 250 so as to allow the vehicle control ECU 40 to guide the vehicle V to the parking section 250.

As illustrated in FIG. 1, the parking assist apparatus 1 includes a front camera 20a, a rear camera 20b, a left camera 20c, and a right camera 20d, as well as a camera ECU 22. The parking assist apparatus 1 further includes a navigation device 30, a wheel speed sensor 32, and a steering angle sensor 34.

As illustrated in FIG. 2, the front camera 20a is installed at the front bumper of or the radiator grill of the vehicle V to capture an image in front of the vehicle. The rear camera 20b is installed at the rear bumper of or the rear garnish of the vehicle V to capture an image behind the vehicle V.

The left camera 20c is installed at the left-wing mirror of the vehicle V to capture a side view image on the left of the vehicle V. A right camera 20d is installed at the right-wing mirror of the vehicle V to capture a side view image on the right of the vehicle V.

Each of the front camera 20a, rear camera 20b, left camera 20c, and right camera 20d has a wide-angle lens or a fisheye lens capable of monitoring a wide angle range such as 180 degrees. With these four cameras 20a-20d, the parking assist apparatus 1 is able to monitor the omnidirectional area of the vehicle V including the road surface.

Hereinafter, the four cameras 20a-20d may collectively be referred to as the "cameras 20".

The camera ECU 22 is configured mainly with a microcomputer including a Central Processing Unit (CPU), a Read Only Memory (ROM), a Random Access Memory (RAM), a flash memory, and the like. The camera ECU 22 controls the cameras 20. Further, the camera ECU 22 includes the image processing device 100 configured to, for example, generate an overhead image and detect a parking section 250 based on the information acquired by the cameras 20.

The navigation device (display) 30 is equipped with a monitor 31 to display images and a memory in which mapping data and the like is stored for navigation. The navigation device 30 navigates the vehicle V to a target point determined by a user of the navigation device 30 based on the stored mapping data and a current position of the vehicle V detected by a GPS or the like (not illustrated). Images during the navigation process are displayed on the monitor 31.

The wheel speed sensor 32 detects a wheel speed of the vehicle V. The wheel speed detected by the wheel speed sensor 32 is inputted to the vehicle control ECU 40.

The steering angle sensor 34 detects a steering angle of the vehicle V. When the vehicle V travels straight, the steering angle sensor 34 reads zero (0) degree (i.e., neutral position). The steering angle sensor 34 outputs a rotation angle with respect to the neutral position as a steering angle. The steering angle detected by the steering angle sensor 34 is inputted to the vehicle control ECU 40.

In addition to the vehicle control ECU 40, the parking assist apparatus 1 includes a steering control unit 50, a throttle control unit 60, and a brake control unit 70.

The vehicle control ECU 40 is configured mainly with a microcomputer including a Central Processing Unit (CPU), a Read Only Memory (ROM), a Random Access Memory (RAM), a flash memory, and the like. The vehicle control ECU 40 is configured to realize various processes for assisting the vehicle V to be parked based on the detected information inputted from the camera ECU 22, the wheel speed sensor 32, and the steering angle sensor 34.

For example, when a driver presses a switch (not illustrated) to activate the parking assist apparatus 1, the vehicle control ECU 40 realizes an automatic parking process to automatically park the vehicle V at the parking section.

The steering control unit 50 drives a steering actuator 52 to control the steering angle of the vehicle V based on the information determined by the vehicle control ECU 40.

The throttle control unit 60 drives a throttle actuator 62 to control the throttle valve of the vehicle V based on the information determined by the vehicle control ECU 40.

The brake control unit 70 drives a brake actuator 72 to control the brake of the vehicle V based on the information determined by the vehicle control ECU 40.

The camera ECU 22, the wheel speed sensor 32, and the steering angle sensor 34 are connected with the vehicle control ECU 40 via a sensor Controller Area Network (sensor CAN® bus) 80 using a vehicle Local Area Network (LAN).

The steering control unit 50, the throttle control unit 60, and the brake control unit 70 are connected with the vehicle control ECU 40 via a vehicle CAN bus 82 using a vehicle LAN.

Figure 5:
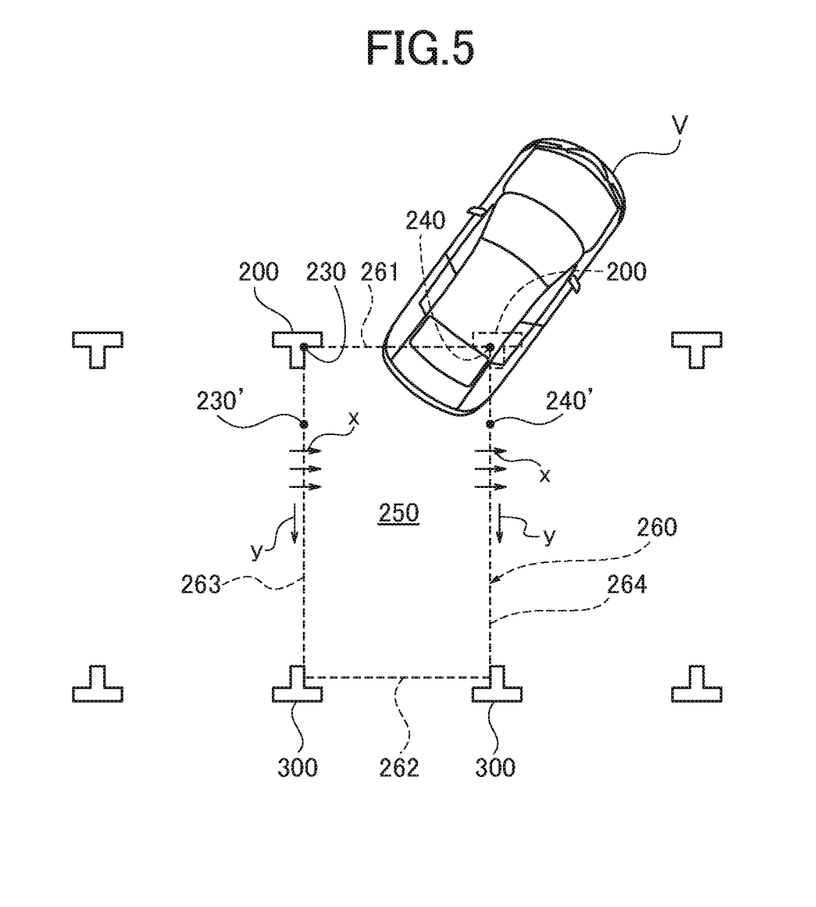
FIG. 5 is a schematic view for explaining how to identify a parking frame of the parking section during a parking operation after setting the provisional parking frame.
Figure 6:
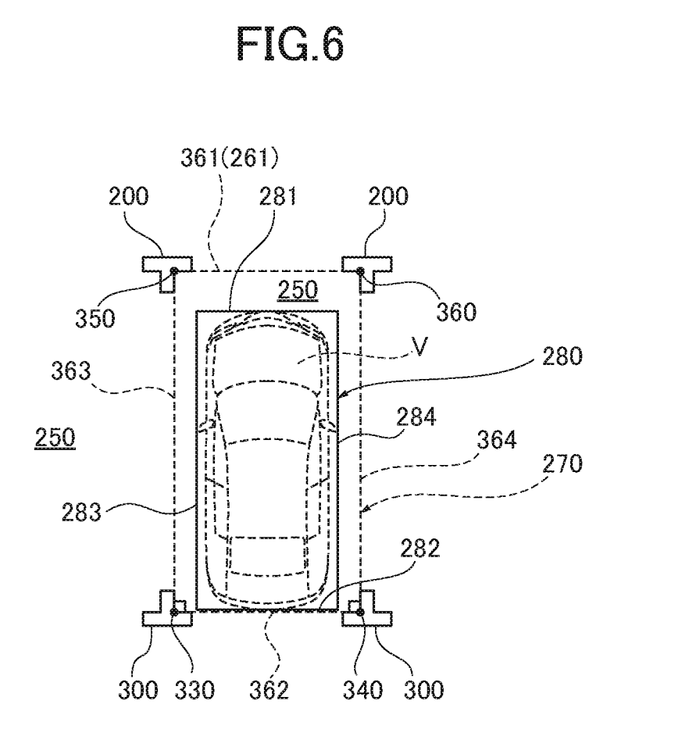
FIG. 6 is a schematic view illustrating the identified parking frame and a target parking frame.

FIG. 5 is a schematic view for explaining how to identify a parking frame 270 of the parking section 250 during the parking operation after setting a provisional parking frame 260. FIG. 6 is a schematic view illustrating the identified parking frame 270 and a target parking frame 280.

As illustrated in FIG. 4, the image processing device 100 sets a provisional parking frame 260 in accordance with the detected parking section 250. The image processing device 100 then outputs the information 121 related to the provisional parking frame 260 (e.g., position and shape of provisional parking frame 260) to the vehicle control ECU 40.

After receiving the information 121 related to the provisional parking frame 260, the vehicle control ECU 40 controls the steering actuator 52, the throttle actuator 62, and the brake actuator 72 in accordance with the preset program to guide the vehicle V to the provisional parking frame 260 while monitoring the wheel speed and the steering angle detected by the wheel speed sensor 32 and the steering angle sensor 34.

As illustrated in FIG. 5, the image processing device 100 identifies a parking frame 270 (shown in FIG. 6) corresponding to the parking section 250 while guiding the vehicle V to the provisional parking frame 260. The image processing device 100 then determines a target parking frame 280 inside the identified parking frame 270 and outputs information 122 related to the target parking frame 280 (e.g., position and shape of target parking frame 280) to the vehicle control ECU 40. Here, the target parking frame 280 has substantially the same size as the vehicle V.

After receiving the information 122 related to the target parking frame 280, the vehicle control ECU 40 controls the steering actuator 52, the throttle actuator 62, and the brake actuator 72 in accordance with the preset program to park the vehicle V at the target parking frame 280 while monitoring the wheel speed and the steering angle detected by the wheel speed sensor 32 and the steering angle sensor 34. As a result, the vehicle V is parked at the target parking frame 280 such that the rear end of the vehicle V is aligned with a rear-end line 362 of the parking frame 270.

The provisional parking frame 260 and the parking frame 270 represent the outline of the parking section 250. As illustrated in FIG. 4, the provisional parking frame 260 is a parking frame provisionally set based on the T-markers 200, 200 at front corners. The parking frame 270 is a parking frame identified based on the T-markers 300, 300 at rear corners and the provisional parking frame 260 while guiding the vehicle V to the provisional parking frame 260, as illustrated in FIG. 6.

The target parking frame 280 is determined inside the parking frame 270, and the rear-end line 362 of the parking frame 270 is aligned with a rear-end line 282 of the target parking frame 280. The target parking frame 280 has substantially the same size as the vehicle V.

As illustrated in FIG. 3, the image processing device 100 includes a controller 110 and a memory 120.

The controller 110 is mainly configured with the CPU of the camera ECU 22 and controls the image processing device 100 entirely. In addition to the CPU, the controller 110 further includes a programmable logic device such as an FPGA and arithmetic elements (i.e., integrated circuit) such as an ASIC.

The memory 120 is mainly configured with a ROM, a RAM, a flash memory, and the like of the camera ECU 22. The memory 120 stores a control program (not illustrated). The control program is executed by the controller 110 during the startup of the image processing device 100 to allow the image processing device 100 to realize the functional configuration shown in FIG. 3.

The memory 120 further stores the information 121 related to the provisional parking frame 260 and the information 122 related to the parking frame 270 and to the target parking frame 280.

As the image processing device 100 of the embodiment is expected to carry out high-speed image processing, it is preferable to have arithmetic elements suitable to high-speed computing, such as an FPGA.

The controller 110 includes a viewpoint converter 111, a marker detector 112, a provisional parking frame setting part 113, a parking frame identifying part 114, a target parking frame determining part 115, and a display controller 116.

Figure 7:
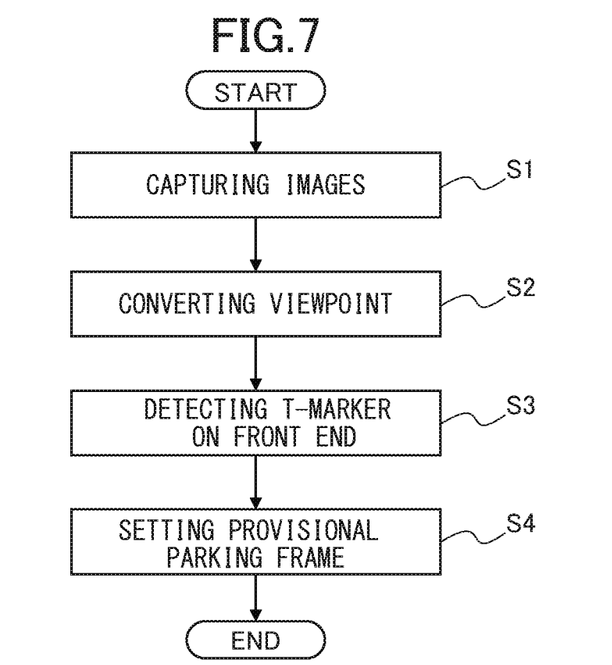
FIG. 7 is a flowchart showing processes of the image processing device to set the provisional parking frame and to output information thereof to a vehicle control ECU.
Figure 8:
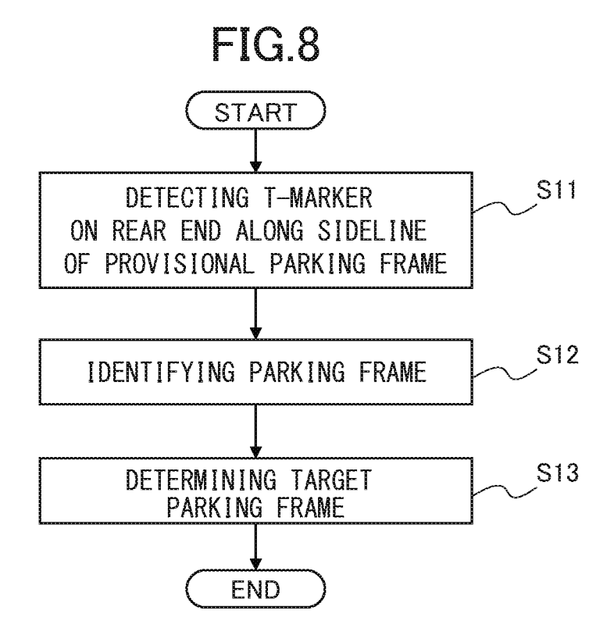
FIG. 8 is a flowchart showing processes of the image processing device to identify the parking frame and to output information related to the target parking frame to the vehicle control ECU while guiding the vehicle to the provisional parking frame.
Figure 9:
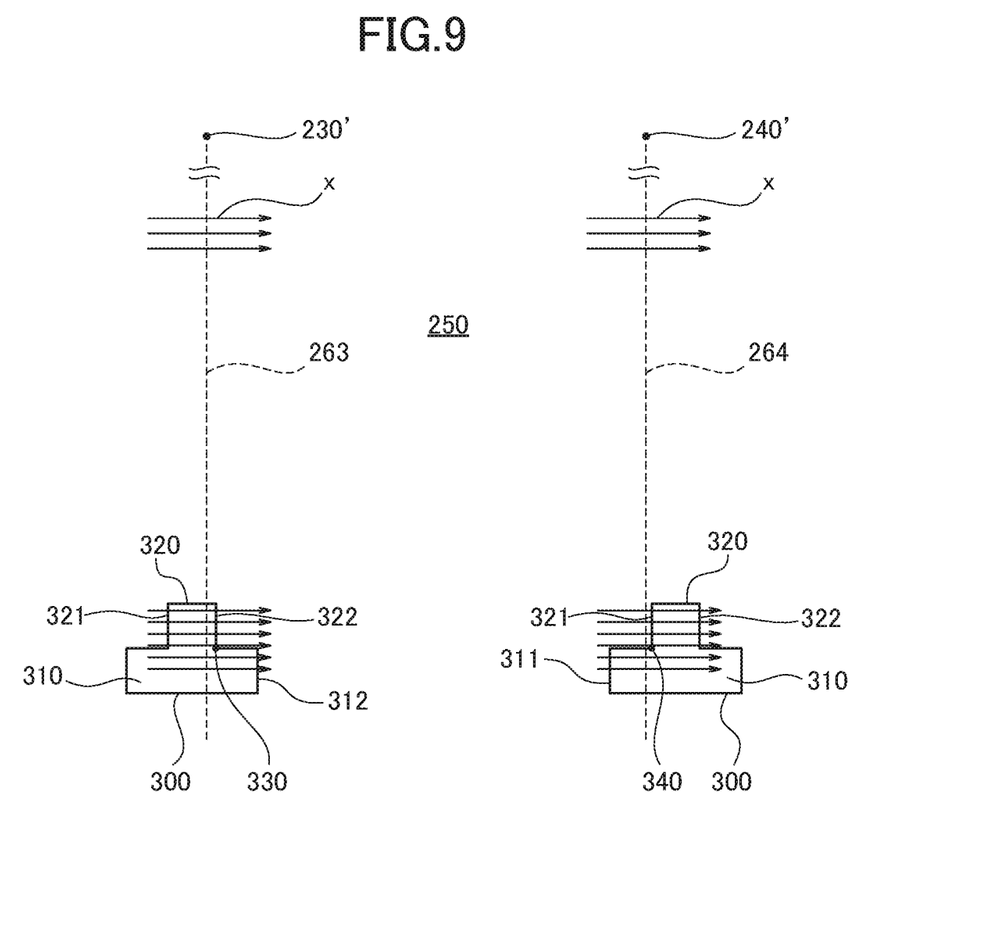
FIG. 9 is a schematic view illustrating processes of the image processing device to detect corners of T-markers at rear corners along sidelines of the provisional parking frame.

FIG. 7 is a flowchart showing processes of the image processing device 100 to set a provisional parking frame 260 and to output the information 121 related thereto to the vehicle control ECU 40. FIG. 8 is a flowchart showing processes of the image processing device 100 to identify a parking frame 270 and to output information 122 related to a target parking frame 280 to the vehicle control ECU 40 while guiding the vehicle V to the provisional parking frame 260. FIG. 9 is a schematic view illustrating processes of the image processing device 100 to detect corners 330, 340 of T-markers 300, 300 at rear corners along sidelines 263, 264 of the provisional parking frame 260.

In Step S1, the viewpoint converter 111 acquires images captured by the four cameras 20. As described above, the four cameras 20 capture images of the road surface around the vehicle V (hereinafter, the images captured by the cameras 20 are also referred to as "through images"). In Step S2, the viewpoint converter 111 converts the acquired through images into overhead images similar to the view of FIG. 4. The overhead images allow the driver to look down the subject vehicle V from the air above the vehicle V.

It should be noted that the viewpoint converter 111 may synthesize the four overhead images, which correspond to the through images captured by the cameras 20, and generate a single overhead image centered upon the vehicle V.

In Step S3, the marker detector 112 detects the two T-markers 200, 200 at front corners of a parking section 250. To be specific, when a parking section 250 exists on the right side of the vehicle V (see FIG. 4, for example), the marker detector 112 detects the two T-markers 200, 200, which exist on the right side of the vehicle V, based on the overhead images generated by the viewpoint converter 111.

Here, the marker detector 112 may detect the T-markers 200, 200 at front corners through a commonly-known edge detection process.

In Step S4, the provisional parking frame setting part 113 sets a provisional parking frame 260 based on the two T-markers 200, 200 at front corners detected by the marker detector 112.

To be specific, the provisional parking frame setting part 113 applies, for example, the Harris corner detection algorithm on the two T-markers 200, 200 at front corners to detect corners 230, 240 corresponding to edges formed at the intersections of the lateral white lines 210 and the vertical white lines 220 of the T-markers 200, 200. The provisional parking frame setting part 113 then sets a front-end line 261 by connecting the detected two corners 230, 240. Further, the setting part 113 sets sidelines 263, 264 orthogonal to the front-end line 261 and extending from the corners 230, 240 by the length of the vehicle V, and sets a rear-end line 262 by connecting the end points of the sidelines 263, 264.

Accordingly, the provisional parking frame setting part 113 defines a provisional parking frame 260 which is formed by connecting the front-end line 261, the rear-end line 262, and the two sidelines 263, 264. Additionally, the setting part 113 stores the information 121 related to the provisional parking frame 260, such as the position thereof, to the memory 120 and outputs the information 121 to the vehicle control ECU 40.

The vehicle control ECU 40 carries out the automatic parking process to guide the vehicle V to the provisional parking frame 260 based on the information 121 related to the provisional parking frame 260 received from the image processing device 100.

During the automatic parking process (e.g., in the status shown in FIG. 5), the image processing device 100 modifies the outline of the parking section 250, in which the provisional parking frame 260 is set, to identify a parking frame 270 based on the two T-markers 300, 300 at rear corners.

To be specific, the marker detector 112 carries out an edge detection process to search an edge by main-scanning the overhead image, which is generated by viewpoint conversion of the present images captured by the cameras 20, only in the vicinity of the sidelines 263, 264 of the provisional parking frame 260 in the direction orthogonal to the sidelines 263, 264 (i.e., in x-direction in FIG. 5).

Accordingly, the marker detector 112 detects the two T-markers 300, 300 positioned at the rear corners of the parking section 250 in the directions along the sidelines 263, 264 of the provisional parking frame 260 (Step S11 of FIG. 8).

That is, as illustrated in FIG. 9, the marker detector 112 carries out the edge detection process of the T-markers 300 at rear corners by main-scanning the overhead image in the vicinity of the sidelines 263, 264 in the direction orthogonal to the sidelines 263, 264 (i.e., in x-direction) as well as by sub-scanning the overhead image in y-direction (i.e., direction orthogonal to x-direction) along the sidelines 263, 264.

Here, the "vicinity of sidelines 263, 264" is a predetermined length range centered upon each sideline 263, 264. The predetermined length is a length slightly longer than the length of the lateral white lines 210 of the T-markers 200 at front corners. The marker detector 112 detects the vicinity of sidelines 263, 264 because the T-markers 300 at rear corners are expected to be positioned on the sidelines 263, 264 of the provisional parking frame 260 or on the extended lines of the sidelines 263, 264 thereof.

As illustrated in FIG. 5, the marker detector 112 determines a start point 230' of the sub-scanning in the y-direction along the sideline 263 by offsetting from the corner 230 (i.e., intersection between sideline 263 and front-end line 261) of the T-marker 200 at front corner toward the rear-end line 262 by a preset length.

Similarly, the marker detector 112 determines a start point 240' of the sub-scanning in the y-direction along the sideline 264 by offsetting from the corner 240 (i.e., intersection between sideline 264 and front-end line 261) of the T-marker 200 at front corner toward the rear-end line 262 by the preset length.

By determining the start points of the sub-scanning in the y-direction to be apart from the T-markers 200, 200 at front corners, it becomes possible to prevent the marker detector 112 from erroneously detecting the T-markers 200, 200 at front corners as edges. As a result, it is possible to detect the T-markers 300, 300 at rear corners reliably.

With the edge detection process, the marker detector 112 detects a positive edge 321 at which the pixel value of the image dramatically increases and a negative edge 322 at which the pixel value of the image dramatically decreases.

The marker detector 112 detects a pair of a positive edge 321 and a negative edge 322 with a distance corresponding to the line width of the vertical white line 320 on the side along the sideline 263 and on the side along the sideline 264. Additionally, on the side of the sideline 263, the marker detector 112 does not detect a positive edge but detects only a negative edge 312 at a portion corresponding to the lateral white line 310. Similarly, on the side of the sideline 264, the marker detector 112 detects only a positive edge 311 but does not detect a negative edge at a portion corresponding to the lateral white line 310.

The marker detector 112 determines the coordinate values of the positive edge 321 and the negative edge 322 just before the position at which a pair of the positive edge 321 and the negative edge 322 is not detected. As illustrated in FIG. 9, with the T-marker 300 at rear left corner of the parking section 250, the negative edge 322 just before the position at which the pair is not detected corresponds to the edge formed at the corner 330 (i.e., intersection between vertical white line 320 and lateral white line 310) of the T-marker 300.

Similarly, with the T-marker 300 at rear right corner of the parking section 250, the positive edge 321 just before the position at which the pair is not detected corresponds to the edge formed at the corner 340 (i.e., intersection between vertical white line 320 and lateral white line 310) of the T-marker.

The parking frame identifying part 114 identifies a parking frame 270, which represents the outline of the parking section 250, based on the corners 330, 340 of the two T-markers 300, 300 at rear corners detected by the marker detector 112 (Step S12 of FIG. 8).

That is, as illustrated in FIG. 6, the parking frame identifying part 114 defines a rear-end line 362 by connecting the corners 330, 340 of the two T-markers 300, 300 at rear corners. The parking frame identifying part 114 also sets the sidelines 363, 364, which are orthogonal to the rear-end line 362 and extends from the corners 330, 340. The parking frame identifying part 114 then determines the intersections 350, 360 between the sidelines 363, 364 and the front-end line 261 of the provisional parking frame 260 stored in the memory 120 so as to define a front-end line 361 by connecting the intersections 350, 360.

Accordingly, the parking frame identifying part 114 identifies a frame formed by connecting the front-end line 361, the rear-end line 362, and the two sidelines 363, 364 as the parking frame 270. As a result, the parking frame 270 is formed based on the T-markers 300, 300 at rear corners (Step S12 of FIG. 8).

The target parking frame determining part 115 determines the rear-end line 362 of the parking frame 270 identified by the parking frame identifying part 114 as the rear-end line 282, and sets a front-end line 281 parallel to the rear-end line 282 at a position offset from the rear-end line 282 toward the front-end line 361 by the vehicle length. Additionally, the target parking frame determining part 115 determines two sidelines 283, 284. The two sidelines 283, 284 are equally separated from the sidelines 363, 364 of the parking frame 270, and the distance therebetween is set identical to the vehicle width.

Accordingly, the target parking frame determining part 115 determines the frame formed by connecting the front-end line 281, the rear-end line 282, and the two side lines 283, 284 as the target parking frame 280 (Step S13 of FIG. 8). Additionally, the target parking frame determining part 115 stores the information 122 related to the target parking frame 280 such as the position thereof to the memory 120.

Further, the target parking frame determining part 115 outputs the information 122 related to the target parking frame 280 to the vehicle control ECU 40.

The rear-end line 282 of the target parking frame 280 is aligned with the rear-end line 362 of the parking section 250, which is partitioned by the T-markers 200, 300.

The vehicle control ECU 40 carries out the automatic parking process to park the vehicle V at the target parking frame 280 based on the information 122 related to the target parking frame 280 received from the image processing device 100. As a result, the vehicle V is parked at the parking section 250 to be aligned with the rear-end line 362 of the parking section 250.

The image processing device 100 of the present embodiment modifies and updates the provisional parking frame 260, which is set based on the T-markers 200, 200 at front corners prior to carrying out the automatic parking process, and identifies the parking frame 270 based on the T-markers 300, 300 at rear corners during the parking operation. With this, it is possible to set the target parking frame 280 during the parking operation with a higher accuracy compared to the accuracy prior to carrying out the parking operation.

The image processing device 100 of the embodiment restricts the search area for detecting the T-markers 300, 300 at rear corners to the vicinity of the sidelines 263, 264 of the provisional parking frame 260. With this, it is possible to reduce the load of the detection process compared to that of the detection process for searching the entire overhead image. That is, it is possible to reduce the operation time and computation load for the detection process.

It should be noted that the display controller 116 of the image processing device 100 is able to display the provisional parking frame 260, the parking frame 270, and/or the target parking frame 280 together with the overhead image on the monitor 31 of the navigation device 30. With this, the driver of the vehicle V is able to visually recognize how the vehicle V is guided to the parking frames (i.e., provisional parking frame 260, parking frame 270, or target parking frame 280).

In the image processing device 100 of the present embodiment, the corners 330, 340 of the T-markers 300, 300 at rear corners detected by the marker detector 112 serve as references for the process identifying the parking frame 270. Therefore, it is preferable to verify the authenticity of the detected corners 330, 340 to improve the reliability of the detected corners 330, 340.

On that account, the marker detector 112 may determine that the detected corners 330, 340 are true when all of the following conditions (1) to (4) are satisfied. On the other hand, the marker detector 112 may determine that the detected corners 330, 340 are false when at least one of the conditions is not satisfied. The parking frame identifying part 114 identifies the parking frame 270 based on only the corners 330, 340 which are determined as true by the marker detector 112.

FIGS. 10 to 13 are schematic views for explaining the verification conditions (1) to (4) of the corners 330, 340 of the T-markers 300, 300 at rear corners. The verification processes are carried out by the marker detector 112.

Figure 10:
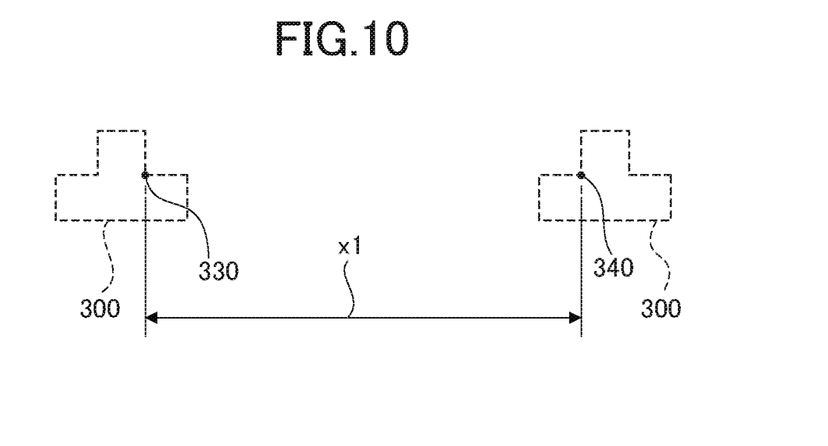
FIG. 10 is a schematic view for explaining a verification condition (1) of the corners verified by a marker detector.

To be specific, as illustrated in FIG. 10, the marker detector 112 first determines whether the distance x1 between the two corners 330, 340 is within a predetermined first threshold value (condition (1)). The first threshold value is a value that can verify that the corners 330, 340 are applicable to the parking section 250 for parking the vehicle V. For example, the first threshold value is set to equal to or greater than the vehicle width and is not more than 1.5 times of the vehicle width.

Figure 11:
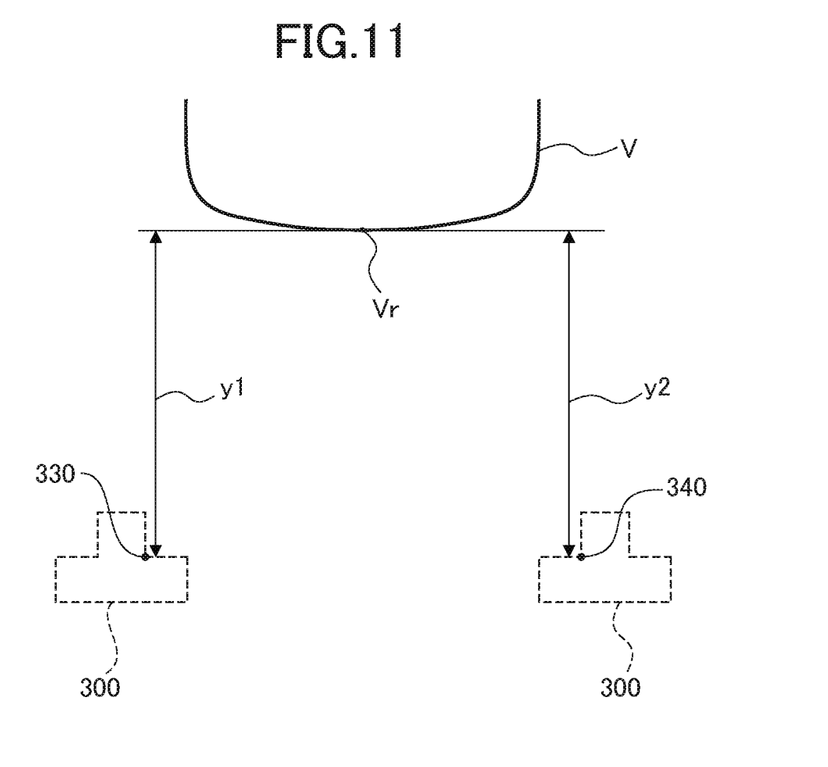
FIG. 11 is a schematic view for explaining a verification condition (2) of the corners verified by the marker detector.

As illustrated in FIG. 11, the marker detector 112 also determines whether each of the distances y1 and y2 which represents the distance from the vehicle rear end Vr to the corresponding corners 330, 340 in the vehicle longitudinal direction is within a predetermined second threshold value (condition (2)). The second threshold value is a value that can verify that the corners 330, 340 are not largely apart from the vehicle rear end Vr. For example, the second threshold value can be determined based on the range in which the overhead image generated from a through image covers.

Figure 12:
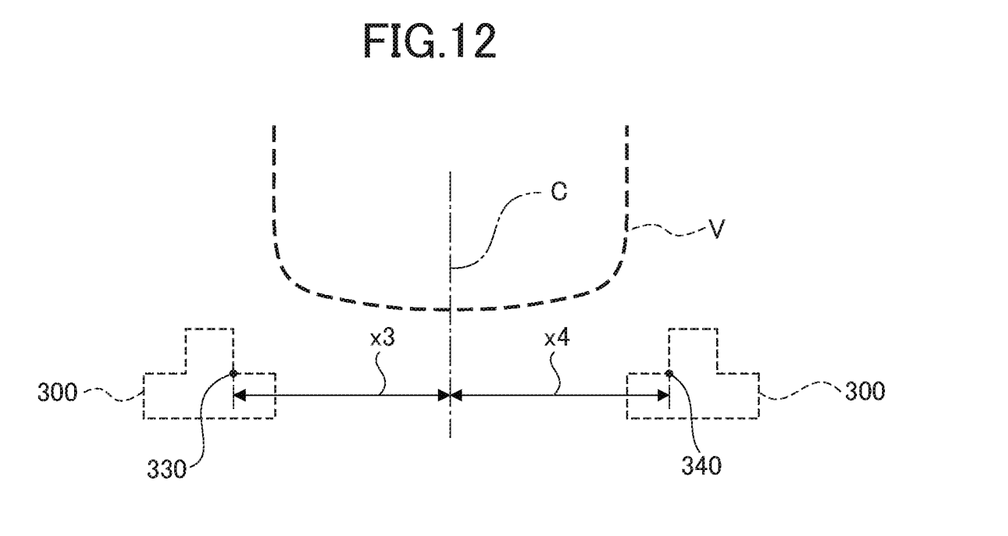
FIG. 12 is a schematic view for explaining a verification condition (3) of the corners verified by the marker detector.

As illustrated in FIG. 12, the marker detector 112 also determines whether the difference between the distance x3 and the distance x4 is within a predetermined third threshold value (condition (3)). Here, the distances x3, x4 are from the center C of the vehicle to the corresponding corners 330, 340 in the vehicle width direction when the vehicle V is assumed to be parked at the provisional parking frame 260. The third threshold value is a value that can verify that one of the corners 330, 340 is not largely biased to one side in the vehicle width direction with respect to the provisional parking frame 260. For example, the third threshold value is about 10 to 15 cm.

Figure 13:
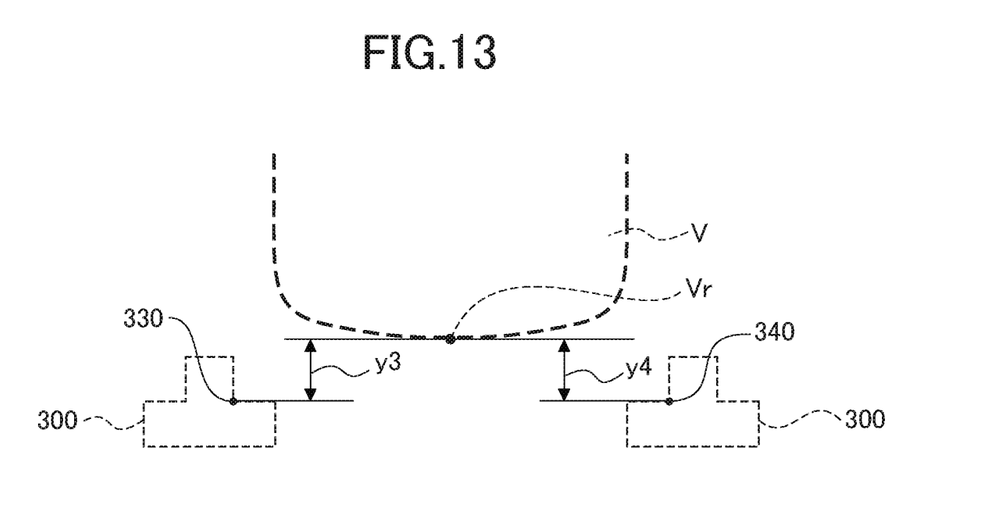
FIG. 13 is a schematic view for explaining a verification condition (4) of the corners verified by the marker detector.

As illustrated in FIG. 13, the marker detector 112 determines whether the difference between the distance y3 and the distance y4 is within a predetermined fourth threshold value (condition (4)). Here, the distances y3, y4 are from the vehicle rear end Vr to the corresponding corners 330, 340 in the vehicle longitudinal direction when the vehicle V is assumed to be parked at the provisional parking frame 260. The fourth threshold value is a value that can verify that the positions of the corners 330, 340 in the vehicle longitudinal direction are similar to each other. For example, the fourth threshold value is about 5 to 10 cm.

Ad described above, it is possible to improve the reliability of the identifying process of the parking frame 270 and thus the reliability of the target parking frame 280 by verifying the authenticity of the detected corners 330, 340 of the T-markers 300, 300 at rear corners.

It should be noted that the marker detector 112 determines the conditions (1) and (2) based on the distance in the images and determines the conditions (3) and (4) based on the physical distance in the world coordinate system in the real space.

That is, the conditions (3) and (4) are used to verify the relative positional relationship of the corners 330, 340 with respect to the provisional parking frame 260. Since the provisional parking frame 260 is stored in the memory 120 as a world coordinate value in the real space, it is facilitating to make the determination based on the physical distance in the world coordinate system. However, it is of course possible to make the determination of the conditions (3) and (4) based on the distances in the image, similar to the determination of the conditions (1) and (2).

In the image processing device 100 of the present embodiment, the T-markers 200, 300 positioned at the four corners of the parking section 250 have the T shapes with the lateral white lines 210, 310 and the vertical white lines 220, 320 orthogonal to the lateral white lines 210, 310. However, the lateral white lines 210, 310 and the vertical white lines 220, 320 of the T-markers 200, 300 may be crossed at an angle other than 90 degrees.

It should be noted that, with the image processing device 100 of the present embodiment, the operations and effects achieved with the T-markers having T shapes of an angle other than 90 degrees are similar to those with the T-markers 200, 300 having T shapes of the angle of 90 degrees.

In the image processing device 100 of the present embodiment, T-markers 200, 300 are applied as the corner markers for the parking section 250. However, the image processing device of the present disclosure is applicable to corner markers having a different shape such as L-markers.

In such a case, the image processing device 100 achieves the similar operations and effects with the L-markers to those with the T-markers.

Although the present disclosure has been described in terms of an exemplary embodiment, it should not be limited thereto. It should be appreciated that variations or modifications may be made in the embodiments described by persons skilled in the art without departing from the scope of the present invention as defined by the following claims.

What is claimed is:

1. An image processing device for detecting a parking section defined by T-markers, the image processing device comprising:
    a camera that is configured to be mounted on a vehicle, the camera being configured to capture an image around the vehicle;
    a marker detector that is configured to carry out an edge detection process on the image to detect the T-markers on a front end of the parking section, the front end being an end close to the vehicle when the vehicle enters the parking section;
    a provisional parking frame setting part that is configured to detect an intersection of each of the detected T-markers on the front end and set a provisional parking frame based on the detected intersections of the T-markers on the front end, the provisional parking frame being set for assisting in parking the vehicle; and
    a parking frame identifying part that is configured to identify a parking frame corresponding to the parking section,
    wherein:
    the marker detector is configured to detect the T-markers on a rear end of the parking section by carrying out the edge detection process in directions orthogonal to sidelines of the provisional parking frame along the sidelines of the provisional parking frame;
    the parking frame identifying part is configured to identify the parking frame based on the detected intersections of the T-markers on the front end and intersections of the detected T-markers on the rear end; and
    the T-markers on the front end and the T markers on the rear end of the parking section are not connected by a sideline.

2. The image processing device according to claim 1, wherein the parking frame identifying part is configured to:
    set a rear-end line by connecting corners of two of the detected T-markers on the rear end;
    set sidelines respectively extending from the corners of the two of the detected T markers on the rear end, the sidelines being orthogonal to the rear-end line;
    set a front-end line by connecting corners of two of the detected T-markers on the front end; and
    identify the parking frame based on the set rear-end line, the set sidelines, and the set front-end line.

3. The image processing device according to claim 1, wherein the marker detector is configured to determine a start point of the edge detection process by offsetting from an intersection between one of the sidelines of the provisional parking frame and a front-end line of the provisional parking frame toward a rear-end line of the provisional parking frame by a preset length along the one of the sidelines of the provisional parking frame.

4. The image processing device according to claim 1, wherein the marker detector is configured to verify two of the detected T markers on the rear end based on at least one of following conditions (1) to (4), and
    wherein the parking frame identifying part is configured to identify the parking frame based on the two T markers on the rear end verified by the marker detector;
    (1) A distance between the two T-markers on the rear end is within a predetermined first threshold value;
    (2) Each of a distance from a rear end of the vehicle to a first of the two T-markers on the rear end and a distance from the rear end of the vehicle to a second of the two T-markers on the rear end is within a predetermined second threshold value;
    (3) A difference between a first position of the first of the two T markers on the rear end and a second position of the second of the two T markers on the rear end in a vehicle width direction is within a predetermined third threshold value when the vehicle is assumed to be parked at the provisional parking frame; or
    (4) A difference between the first position of the first of the two T-markers on the rear end and the second position of the second of the two T-markers on the rear end in a vehicle longitudinal direction is within a predetermined fourth threshold value when the vehicle is assumed to be parked at the provisional parking frame.

5. An image processing method for detecting a parking section defined by T-markers, using an image around a vehicle captured by a vehicle-mounted camera, the image processing method comprising:
    detecting the T-markers on a front end of the parking section by carrying out an edge detection process on the image, the front end being an end close to the vehicle when the vehicle enters the parking section;
    detecting an intersection of each of the detected T-markers on the front end and setting a provisional parking frame based on the detected intersections of the T-markers on the front end, the provisional parking frame being set for assisting in parking the vehicle;

detecting the T-markers on a rear end of the parking section by carrying out the edge detection process in directions orthogonal to sidelines of the provisional parking frame along the sidelines of the provisional parking frame; and identifying a parking frame corresponding to the parking section based on the detected intersections of the T-markers on the front end and intersections of the detected T-markers on the rear end, wherein the T markers on the front end and the T-markers on the rear end of the parking section are not connected by a sideline.

6. The image processing method according to claim 5, further comprising:

setting a rear-end line by connecting corners of two of the detected T-markers on the rear end;

setting sidelines respectively extending from the corners of the two of the detected T markers on the rear end, the sidelines being orthogonal to the rear-end line;

setting a front-end line by connecting corners of two of the detected T-markers on the front end; and identifying the parking frame based on the set rear-end line, the set sidelines, and the set front-end line.

7. The image processing method according to claim 5, further comprising:

determining a start point of the edge detection process by offsetting from an intersection between one of the sidelines of the provisional parking frame and a front-end line of the provisional parking frame toward a rear-end line of the provisional parking frame by a preset length along the one of the sidelines of the provisional parking frame.

8. The image processing method according to claim 5, further comprising:

verifying two of the detected T-markers on the rear end based on at least one of following conditions (1) to (4); and identifying the parking frame based on the two T markers on the verified rear end;

(1) A distance between the two T-markers on the rear end is within a predetermined first threshold value;

(2) Each of a distance from a rear end of the vehicle to a first of the two T-markers on the rear end and a distance from the rear end of the vehicle to a second of the two T markers on the rear end is within a predetermined second threshold value;

(3) A difference between a first position of the first of the two T markers on the rear end and a second position of the second of the two T markers on the rear end in a vehicle width direction is within a predetermined third threshold value when the vehicle is assumed to be parked at the provisional parking frame; or (4) A difference between the first position of the first of the two T-markers on the rear end and the second position of the second of the two T-markers on the rear end in a vehicle longitudinal direction is within a predetermined fourth threshold value when the vehicle is assumed to be parked at the provisional parking frame.

9. The image processing device according to claim 1, wherein the marker detector is configured to carry out the edge detection process from a position offset from the T markers on the front end along the sidelines of the provisional parking frame by a preset length.

10. The image processing method according to claim 5, wherein the edge detection process is carried out from a position offset from the T markers on the front end along the sidelines of the provisional parking frame by a preset length.

11. The image processing device according to claim 1, wherein the parking frame identifying part is configured to:

define a rear-end line by connecting the T markers on the rear end;

determine intersections between sidelines extending from the T-markers on the rear end in directions orthogonal to the rear-end line and a front-end line connecting the T markers on the front end; and identify the parking frame based on the rear-end line, a straight line connecting the determined intersections, and the sidelines extending from the T markers on the rear end in directions orthogonal to the rear-end line.

12. The image processing method according to claim 5, wherein the identifying the parking frame comprises:

defining a rear-end line by connecting the T-markers on the rear end;

determining intersections between sidelines extending from the T-markers on the rear end in directions orthogonal to the rear-end line and a front-end line connecting the T markers on the front end; and identifying the parking frame based on the rear-end line, a straight line connecting the determined intersections, and the sidelines extending from the T markers on the rear end in directions orthogonal to the rear-end line.

13. The image processing device according to claim 1, wherein the T-markers on the front end and the T markers on the rear end are defined by two white lines crossing each other.

14. The image processing method according to claim 5, wherein the T-markers on the front end and the T markers on the rear end are defined by two white lines crossing each other.

* * * * *